United States Patent
Shaw et al.

(10) Patent No.: US 10,819,561 B2
(45) Date of Patent: Oct. 27, 2020

(54) INTELLIGENT AUTOMATIC NETWORK OPERATIONS INTERFACE USED TO RESOLVE A NETWORK OUTAGE(S)

(71) Applicant: AT&T Intellectual Property I, LP, Atlanta, GA (US)

(72) Inventors: Venson Shaw, Kirkland, WA (US); Jin He, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 468 days.

(21) Appl. No.: 14/743,505

(22) Filed: Jun. 18, 2015

(65) Prior Publication Data
US 2015/0288560 A1  Oct. 8, 2015

Related U.S. Application Data

(63) Continuation of application No. 13/711,176, filed on Dec. 11, 2012, now Pat. No. 9,065,729.

(51) Int. Cl.
*H04L 12/24* (2006.01)
*H04L 12/26* (2006.01)

(52) U.S. Cl.
CPC ........ *H04L 41/0654* (2013.01); *H04L 41/064* (2013.01); *H04L 41/5012* (2013.01); *H04L 41/5025* (2013.01); *H04L 43/16* (2013.01); *H04L 43/10* (2013.01)

(58) Field of Classification Search
None
See application file for complete search history.

(56) References Cited

U.S. PATENT DOCUMENTS

| | | | | |
|---|---|---|---|---|
| 6,249,812 B1* | 6/2001 | Cromer | ............... | H04L 41/0681 709/220 |
| 6,701,449 B1* | 3/2004 | Davis | ................. | H04L 41/0677 714/4.11 |
| 7,257,514 B2* | 8/2007 | Faihe | .................. | G06F 11/2257 702/183 |
| 8,520,603 B2* | 8/2013 | Kozisek | ............. | H04L 41/0823 370/315 |
| 8,626,151 B2* | 1/2014 | Beppler | ................ | H04W 48/18 370/252 |
| 2006/0052966 A1* | 3/2006 | Mosher | ................. | G01M 99/00 702/125 |
| 2006/0116898 A1* | 6/2006 | Peterson | .............. | G06Q 40/025 705/38 |
| 2007/0276631 A1* | 11/2007 | Subramanian | ........ | G06F 11/008 702/186 |
| 2010/0151850 A1* | 6/2010 | Majmundar | ............ | H04L 67/36 455/423 |

(Continued)

*Primary Examiner* — Lance Leonard Barry
(74) *Attorney, Agent, or Firm* — BakerHostetler

(57) ABSTRACT

A network device may receive intelligent operations interface information that may comprise resources or events that may affect a communication system. The intelligent operations interface information may be processed to isolate network performance problems and effectuate a prioritized resolution of the network performance problems. The intelligent operations interface may take into account a ripple effect of fixing or not fixing one network performance problem over another network performance problem when determining the prioritized resolution of the network performance problems.

20 Claims, 9 Drawing Sheets

(56) References Cited

U.S. PATENT DOCUMENTS

| | | | | |
|---|---|---|---|---|
| 2011/0191132 A1* | 8/2011 | Westcott | ................ | G06Q 10/06 |
| | | | | 705/7.11 |
| 2011/0275364 A1* | 11/2011 | Austin | .................... | H04L 41/06 |
| | | | | 455/423 |
| 2011/0319071 A1* | 12/2011 | Beppler | ................ | H04W 48/18 |
| | | | | 455/424 |
| 2012/0047219 A1* | 2/2012 | Feng | ...................... | G06Q 30/02 |
| | | | | 709/207 |
| 2012/0230214 A1* | 9/2012 | Kozisek | ............. | H04L 41/0823 |
| | | | | 370/252 |
| 2012/0265502 A1* | 10/2012 | Omitaomu | ............ | G06Q 50/06 |
| | | | | 703/2 |
| 2012/0297421 A1* | 11/2012 | Kim | ....................... | H04N 5/445 |
| | | | | 725/41 |
| 2013/0117267 A1* | 5/2013 | Buryak | ............... | G06F 16/3323 |
| | | | | 707/737 |
| 2013/0185592 A1* | 7/2013 | Fleming | ............. | G06F 11/0709 |
| | | | | 714/37 |
| 2014/0376707 A1* | 12/2014 | Pearce | ................ | H04M 3/5175 |
| | | | | 379/265.03 |

* cited by examiner

INTELLIGENT AUTOMATIC NETWORK OPERATIONS INTERFACE USED TO RESOLVE A NETWORK OUTAGE(S)

CROSS REFERENCE TO RELATED APPLICATIONS

This patent application is a continuation of U.S. patent application Ser. No. 13/711,176, filed Dec. 11, 2012, entitled INTELLIGENT AUTOMATIC NETWORK OPERATIONS INTERFACE, and granted as U.S. Pat. No. 9,065,729, the contents of which is incorporated by reference herein in its entirety.

TECHNICAL FIELD

The technical field generally relates to telecommunications and more specifically relates to network operations management.

BACKGROUND

A network operations center (NOC) is a place from which administrators supervise, monitor, and maintain a telecommunications network. The NOC may contain visualizations of the network or networks that are being monitored, workstations at which the current status of the network can be seen, and the necessary software to manage the networks for quality and uptime. Network quality and up time may affect network costs, reputation of a network provider, and ultimately revenue generation for a network provider. It may be important for a network provider to quickly recognize and resolve network outages.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

In an embodiment, a method may comprise receiving information, wherein the information comprises a performance indicator. After detecting that the performance indicator has crossed a predetermined performance indicator threshold, the method may also comprise determining the performance problem in the network based on a first analysis of the information, determining a solution instruction that resolves the determined performance problem in the network based on a second analysis of the information, and communicating the solution instruction.

In an embodiment, a network device may comprise a processor and a memory coupled to the processor, the memory having stored thereon executable instructions that when executed by the processor cause the processor to effectuate operations. The operations may comprise receiving information, wherein the information comprises a performance indicator, detecting that the performance indicator has crossed a predetermined threshold, wherein the performance indicator crossing the predetermined threshold is indicative of a performance problem in a network, determining the performance problem in the network based on a first analysis of the information, determining a solution instruction that resolves the determined performance problem in the network based on a second analysis of the information, and communicating the solution instruction.

In an embodiment, a network device may comprise a processor and a memory coupled to the processor, the memory having stored thereon executable instructions that when executed by the processor cause the processor to effectuate operations. The operations may comprise receiving information, wherein the information comprises a plurality of performance indicators. The effectuated operations may also comprise detecting a first performance problem of a network based on at least one of the plurality of performance indicators crossing a first predetermined threshold, detecting a second performance problem of the network based on at least one of the plurality of performance indicators crossing a second predetermined threshold, determining a first solution instruction for the detected first performance problem in the network based on a first analysis of the information, determining a second solution instruction for the detected second performance problem in the network based on a second analysis of the information, determining a priority for the first solution instruction and a priority for the second solution instruction, and communicating the first solution instruction and the second solution instruction based on the determined priority of the first solution instruction and the priority of the second solution instruction.

BRIEF DESCRIPTION OF THE DRAWINGS

The following detailed description of example embodiments is better understood when read in conjunction with the appended drawings. For the purposes of illustration, the drawings show exemplary embodiments. The subject matter is not limited to the specific elements and instrumentalities disclosed. In the drawings.

DETAILED DESCRIPTION OF ILLUSTRATIVE EMBODIMENTS

Figure 1:
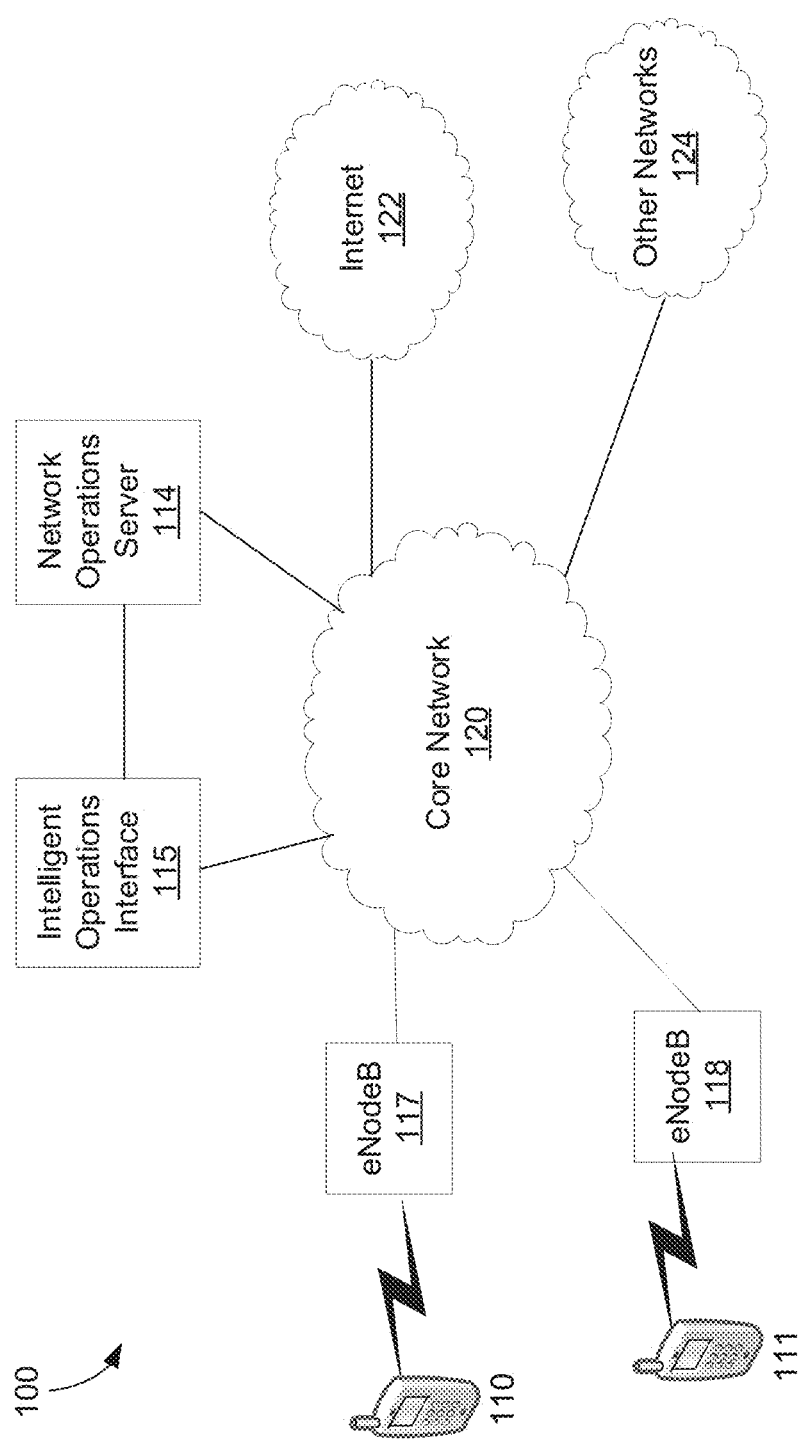
FIG. 1 illustrates a non-limiting exemplary network configuration for long term evolution (LTE) according to one or more disclosed embodiments of an intelligent operations interface.

FIG. 1 is an exemplary illustration of a communications system 100 in which one or more of the disclosed embodiments may be implemented. In FIG. 1, a wireless transmit/receive unit (WTRU) 110 and WTRU 111 may be connected, respectively, to an evolved node B (eNodeB) 117 and eNodeB 118. The eNodeB 117 and eNodeB 118 may be connected to core network 120. Core network 120 may be connected with an intelligent operations interface 115, and a network operations server 114. As shown in FIG. 1, the communications system 100 may also include the Internet 122 and other networks 124. The disclosed embodiment contemplates any number of WTRUs, eNodeBs, networks, and/or network elements. Network operations server 114 may be a server that monitors the condition of an operator network. For example, network operations server 114 may monitor performance indicators and communicate an outage to a display in a NOC by use of a color coded icon which may indicate an error or exception condition of a network element.

Intelligent operations interface 115 may be a server that analyzes intelligent operations interface information of devices, resources, or events that may affect communication system 100. For example, the intelligent operations interface information may comprise information such as, data and voice traffic patterns, errors, outages, current or predicted weather conditions for a geographic area, power outages for a geographic area, device specifications, site specifications, geographic area covered (e.g., area relating to source of problem and/or location of symptom), usage level of a service, skill level of operator personnel, survey information, trending social media or search information, among other things, all of which may be current or historical information.

Figure 2:
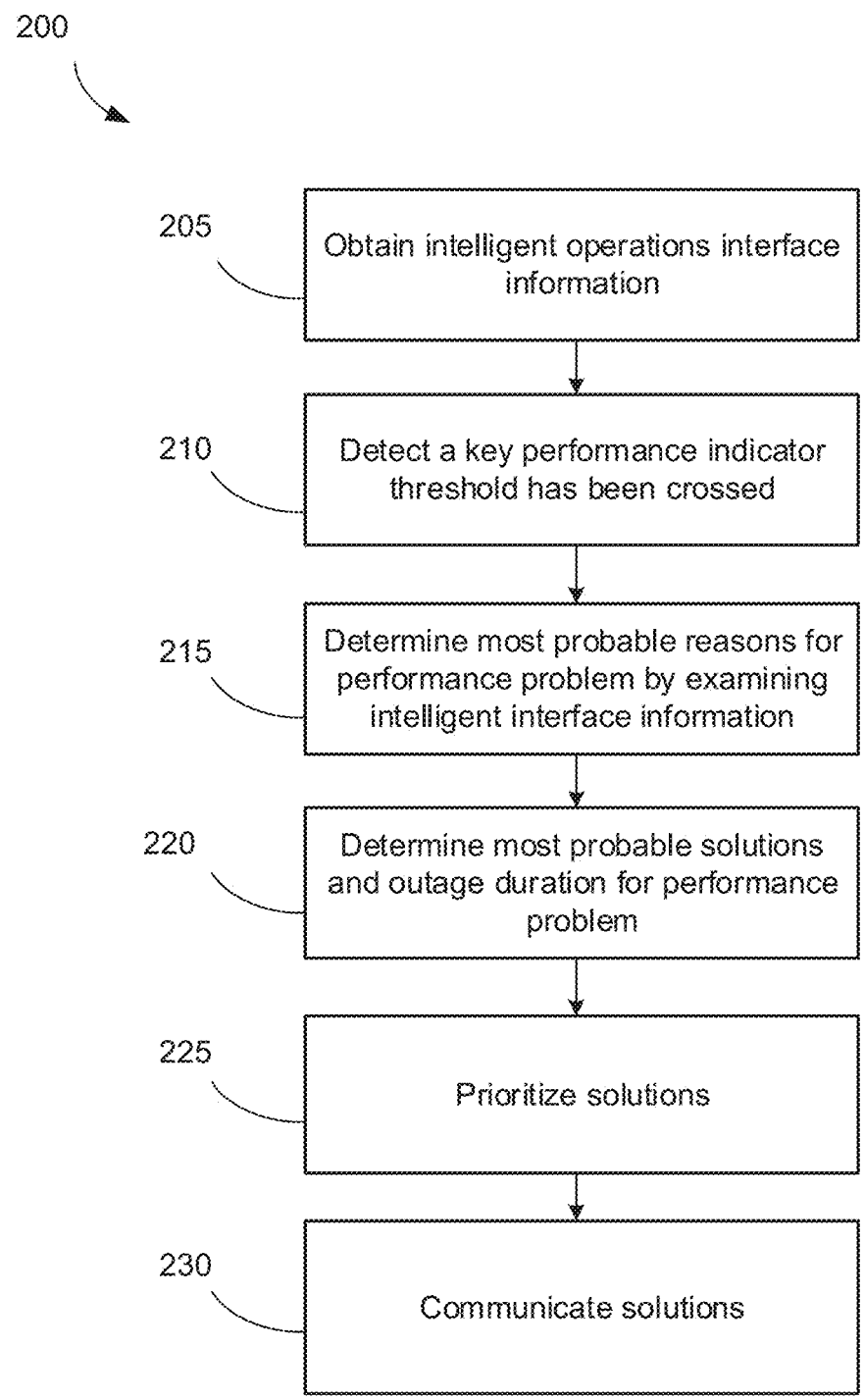
FIG. 2 illustrates a non-limiting exemplary method of implementing one or more disclosed embodiments of an intelligent operations interface.

FIG. 2 illustrates a non-limiting exemplary method of implementing one or more disclosed embodiments of an intelligent operations interface. In method 200 at block 205, an intelligent operations interface may obtain intelligent operations interface information about devices, resources, or events that may affect a communication system. At block 210, it may be detected that a key performance indicator threshold has been crossed. The key performance indicator (KPI) may be a selected subset of the intelligent operations interface information that is tracked to determine a performance problem with a network element, for example. The KPI may be selected by an operator, automatically selected based on a network architecture, or the like. At block 215, once a problem is detected, the most probable reason for the performance problem (e.g., KPI crossing the threshold) may be determined by analyzing the intelligent operations interface information. In an embodiment, the analysis may include alarm correlation, wherein an alarm or error condition is correlated across alarms or error conditions for similar devices or devices in the same geographic location. In an embodiment, the analysis may include time correlation with network events or configuration changes, which may include a new mobile device release, a new network element installation, or a new operating system release. The analysis may assist in narrowing down the problem to a geographic location or venue, a network element, and the like.

At block 220, the likely solution for the error condition and outage duration may be determined. In an embodiment, there may be multiple likely solutions and accompanying durations that cross a threshold confidence level and are displayed to an operator and/or automatically executed by a network element. For example, if a flood is determined to be the reason for the error condition, a recommended fix may comprise a plurality of actions such as, a pump automatically being engaged to pump the water out, the power to the equipment in the affected vicinity automatically turned off, and a message sent to selected personnel to inspect the site and make additional repairs. The personnel selection may be based on the proximity of the personnel to the affected site and the skill level of the personnel. The estimated outage duration may also be based on the skill level of the selected personnel and other intelligent operations interface information.

At block 225, the recommended solutions that fall within the confidence level may be prioritized based on one or more of the intelligent operations interface information categories. In an embodiment, the intelligent operations interface server may take into account previously recorded results of customer satisfaction surveys. For example, customer satisfaction surveys may have been conducted during or right after a plurality of similar outages. The customer satisfaction surveys may assist in quantifying what should be repaired first, which may result in a recommendation that may be considered counterintuitive (e.g., repair of SMS before voice). In an embodiment, the intelligent operations interface server, when determining priority of implementing the solutions, may take into account a predicted ripple effect of fixing (or not fixing) one outage over another outage. Ripple effect includes the consideration of traffic congestion, lack of power, and the like, in areas of a network that may not be directly affected by the outage. Referring to FIG. 1 in an exemplary scenario with regard to the use of a customer satisfaction survey, there may a device outage at eNodeB 117 and eNodeB 118. If the device at eNodeB 117 is repaired before the device at eNodeB 118, there may be relatively quick restoration of all services to a relatively small number of subscribers. Yet, if the device at eNodeB 118 is repaired before the device at eNodeB 117, there may be relatively quick restoration of "basic" services, but result in an extended wait for restoration of other services. In this scenario, analysis of customer satisfaction surveys may help determine whether to prioritize eNodeB 117 over eNodeB 118.

At block 230, the intelligent operations interface may communicate some or all of the solution for automatic implementation by a device and/or communicate the solution to a display for human intervention. In an embodiment, a communication to a human operator may include a plurality of solutions with accompanying advantages, disadvantages, and confidence levels.

Figure 3:
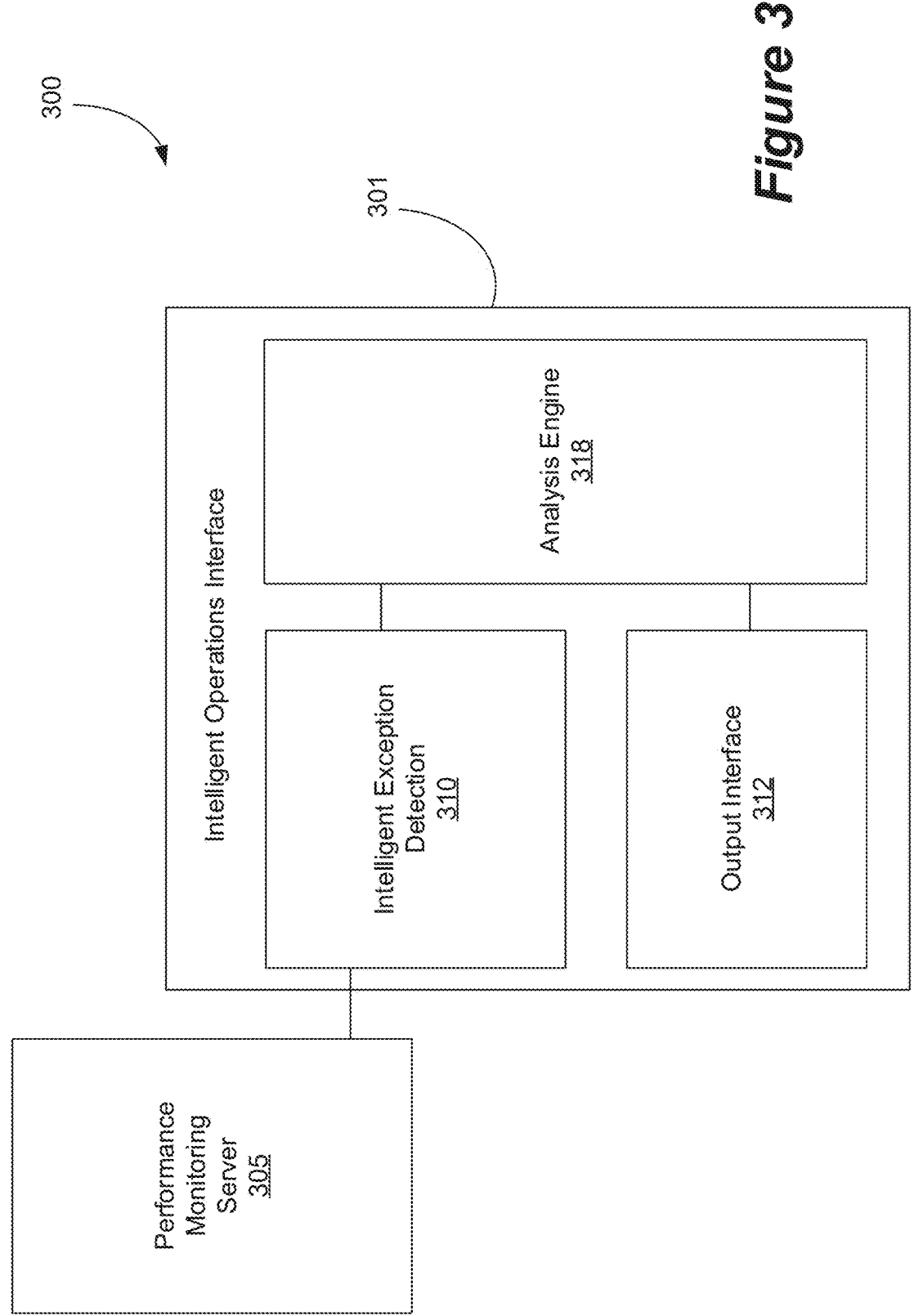
FIG. 3 illustrates a non-limiting exemplary network configuration for LTE according to one or more disclosed embodiments of an intelligent operations interface.

FIG. 3 is an exemplary embodiment of a system 300 that may implement an intelligent operations interface 301. The intelligent operations interface 301 may be communicatively connected to a performance monitoring server 305. The performance monitoring server 305 may compile real-time trace data from network elements and communicate the performance data to an intelligent exception detection engine 310. Generally, trace data may comprise kernel or application-defined events that may be sent to a log file. The events may be consumed in real time or from a log file and used to debug an application/device or to determine where performance issues are occurring in the application/device. Performance monitoring server 305 may probe network devices periodically for performance data. In an embodiment, a performance monitoring system may probe more frequently when an adverse weather conditions (e.g., hurricane or blizzard) is expected.

As part of the intelligent operations interface, the intelligent exception detection engine 310 may detect problems based on a single intelligent operations interface information category (e.g., cyclic redundancy errors) or an aggregate of a plurality of intelligent operations interface information categories (e.g., a weather forecast, cyclic redundancy errors, amount of data traffic across a link, and type of data traffic across the link) that cross a determined threshold which may indicate an error or outage. In an embodiment, the aggregate threshold may be based on trending data that may predict a problem. The prediction may be based on historical data on usage of equipment over a period of time or other intelligent operations interface information.

Analysis engine 318 may analyze network and device specifications, historical network outage interruptions as well as other intelligent operations interface information categories in order to create correlations and predictions that may link errors or outages to probable solutions. When analyzing solutions, predicting problems, and other analysis functions, analysis engine 318 may consider the ripple effects of the outage itself, which devices to repair, or even whether to add capacity in place of (or in addition to) repair. Analysis engine 318 may also periodically update (e.g., every hour, day, or month) the threshold metrics used by the intelligent exception detection engine 310. As discussed herein, confidence level may be may be part of the analysis process. There may be a minimum threshold the confidence level must stay above before an automatic solution or any solution is recommend or even acted upon. Crossing a threshold as discussed herein may be a number that is prescribed to determine when some action is triggered. For example, a threshold may be crossed if the number of keepalives from a device is below a certain amount (e.g., 3) within a timeframe (e.g., 10 minutes) and therefore an alert may be triggered. In another example, a threshold may be crossed if the number of errors is above a certain amount (e.g., 100) within a certain time frame (e.g., 1 minute) and therefore an alert may be triggered.

The analysis engine 318 may be connected with an output interface 312. The output interface 312 may communicate fix instructions to a prescribed operations owner which may include an outage ticketing system. There may also be an interface with other systems for an automatic fix of the error or outage.

Intelligent operations interface 301 may work using an expert system which may be considered an artificial intelligence solution. Intelligent operations interface 115 may comprise an expert system based inference engine (not shown). The inference engine may perform functions of forward chaining—data driven, backward chaining—goal driven, or mixed chaining Intelligent operations interface server 301 may store local expert system data and rule sets as well as sync with a target architecture knowledge management which may provide imperial data to add or update rules.

As discussed herein, intelligent operations interface information may include data regarding voice and data traffic patterns, errors, outages, current or predicted weather conditions for a geographic area, power outages for a geographic area, device specifications, site specifications, a geographic area covered, usage level of a service, skill level of operator personnel, survey information, trending social media or search information, and the like. For example, data and voice traffic patterns may include information such as usage amounts, time of day of usage, and source and/or destination of data and voice traffic for one or more device or communication link in a network. Errors may include cyclic redundancy check errors, packet loss, or the like for one or more device or communication link in a network. Outages may include lack of power to a device, loss of a connection with a device, or the like. Current or predicted weather conditions for a geographic area may include temperature, wind speeds, amount of precipitation, as well as quantifiable indicators for the presence or lack of extreme weather or Acts of God such as a hurricane, an earthquake, a flood, and other natural disasters. Device specifications may include power consumption needs, cooling needs, water resistance, processor or transmission speed and/or capacity, and the like for a device.

Other examples, comprise site specification which may include information concerning the capability of back-up power generation, type and resiliency of power grid connections, proximity to an adverse condition (e.g., weather, temperatures, power outages), ability to withstand an adverse condition, communication connections, and the like. Geographic area covered may include a region, country, state, county, city, district, or the like. Usage level of a service may include information with regard to the frequency a service is used, as well as the number of people, devices, or entities (e.g., business or government) that use the service. Skill level of operator or other personnel information may include total number of years worked, number of years worked within a region, types of outages resolved, number of outages resolved, certifications, employer performance reviews of an employee, and the like. Skill level of personnel in a geographic region may be used determine if more or less people should be sent to a site. Including skill level of personnel in the analysis may lead to more effective and time efficient solutions with less people. Surveys may include customer satisfaction surveys and other surveys that may answer questions regarding a prioritized preference of a customer with regard to the resolution of a network outage, everyday customer use of the service, and the like. The use of social media or search information may include the analysis of key words in order to understand the symptoms and ultimate source and possible prioritized solution of a performance problem.

Figure 4:
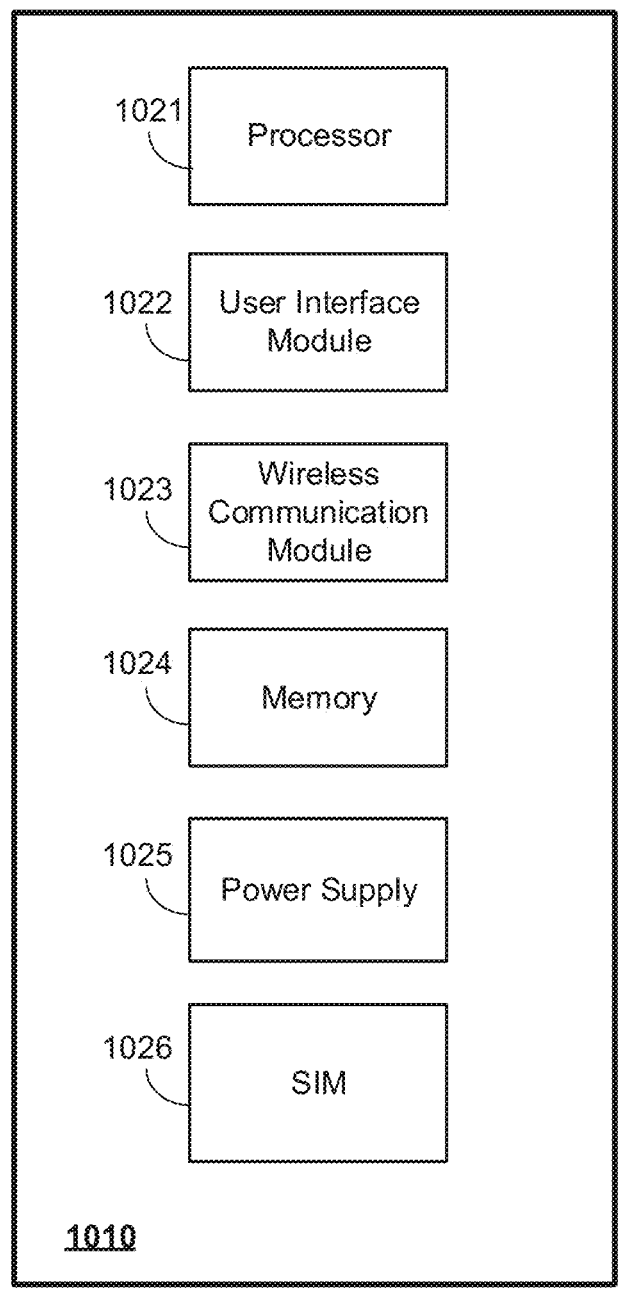
FIG. 4 is a block diagram of a non-limiting exemplary mobile device in which aspects of one or more disclosed embodiments of an intelligent operations interface may be implemented.

FIG. 4 illustrates an example wireless device 1010 that may be used in connection with an embodiment. References will also be made to other figures of the present disclosure as appropriate. For example, mobile devices 110 and 111 may be wireless devices of the type described in regard to FIG. 4, and may have some, all, or none of the components and modules described in regard to FIG. 4. It will be appreciated that the components and modules of wireless device 1010 illustrated in FIG. 4 are illustrative, and that any number and type of components and/or modules may be present in wireless device 1010. In addition, the functions performed by any or all of the components and modules illustrated in FIG. 4 may be performed by any number of physical components. Thus, it is possible that in some embodiments the functionality of more than one component and/or module illustrated in FIG. 4 may be performed by any number or types of hardware or a combination of hardware and software.

Processor 1021 may be any type of circuitry that performs operations on behalf of wireless device 1010. Such circuitry may include circuitry and other components that enable processor 1021 to perform any of the functions and methods described herein. Such circuitry and other components may also enable processor 1021 to communicate and/or interact with other devices and components, for example any other component of device of wireless device 1010, in such a manner as to enable processor 118 and such other devices and/or components to perform any of the disclosed functions and methods. In one embodiment, processor 1021 executes software (computer readable instructions stored in a computer readable storage medium which is not a transient signal) that may include functionality related to intelligent operations interface, for example. User interface module 1022 may be any type or combination of hardware or a combination of hardware and software that enables a user to operate and interact with wireless device 1010, and, in one embodiment, to interact with a system or software enabling the user to place, request, and/or receive calls, text communications of any type, voicemail, voicemail notifications, voicemail content and/or data, and/or a system or software enabling the user to view, modify, or delete related software objects. For example, user interface module 1022 may include a display, physical and/or "soft" keys, voice recognition software, a microphone, a speaker and the like. Wireless communication module 1023 may be any type of transceiver including any combination of hardware or a combination of hardware and software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 5:
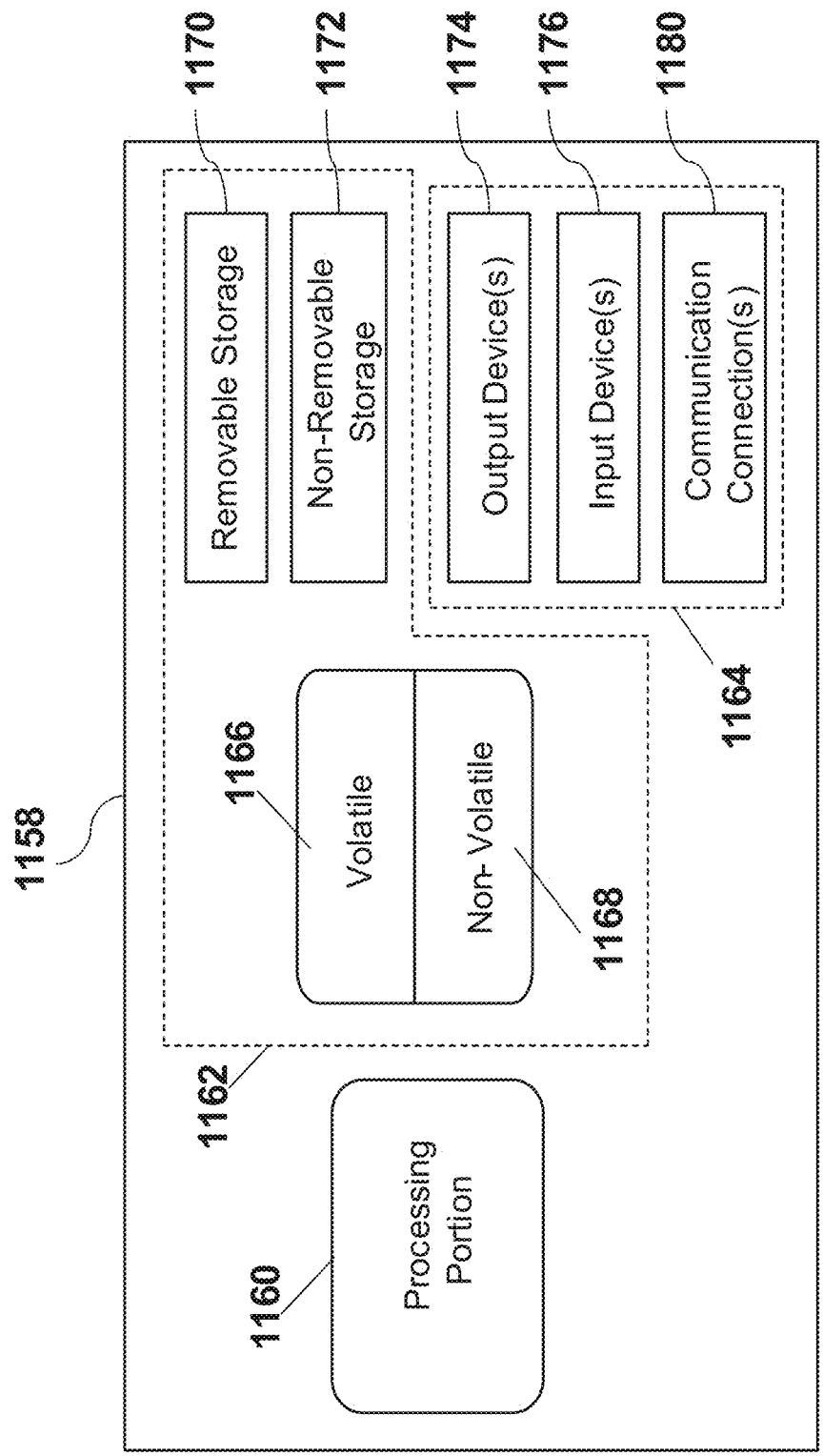
FIG. 5 is a block diagram of a non-limiting exemplary processor in which aspects of one or more disclosed embodiments of an intelligent operations interface may be implemented.

FIG. 5 is a block diagram of an example processor 1158 which may be employed in any of the embodiments described herein, including as one or more components of mobile devices 110 and 111, as one or more components of network equipment such as MMEs, and HSSs, and/or CMS, or any other component of networks 110 and 111, and/or any related equipment, and/or as one or more components of any third party system or subsystem that may implement any portion of the subject matter described herein. It is emphasized that the block diagram depicted in FIG. 5 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof. Processor 1158 may include circuitry and other components that enable processor 1158 to perform any of the functions and methods described herein. Such circuitry and other components may also enable processor 1158 to communicate and/or interact with other devices and components, for example any other component of any device disclosed herein or any other device, in such a manner as to enable processor 1158 and such other devices and/or components to perform any of the disclosed functions and methods.

As depicted in FIG. 5, the processor 1158 comprises a processing portion 1160, a memory portion 1162, and an input/output portion 1164. The processing portion 1160, memory portion 1162, and input/output portion 1164 are coupled together (coupling not shown in FIG. 5) to allow communications between these portions. The input/output portion 1164 is capable of providing and/or receiving components, commands, and/or instructions, utilized to, for example, request and receive APNs, MNCs, and/or MCCs, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any other function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing APNs, MNCs, MCCs, service requests, radio resource requests, QoS and/or APN parameters, software for intelligent operations interface, text and data communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 may include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the processor 1158. Any such computer storage media may be part of the processor 1158 and is not contemplated herein to be a transient signal.

The processor 1158 may also contain the communications connection(s) 1180 that allow the processor 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media, wherein storage media is not a transient or propagated signal. The processor 1158 also can have input device(s) 1176 such as keyboard, keypad, mouse, pen, voice input device, touch input device, etc. Output device(s) 1174 such as a display, speakers, printer, etc. also can be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how intelligent operations interface may be implemented with stationary and non-stationary network structures and architectures in order to do intelligent operations interface. It can be appreciated, however, that intelligent operations interface as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1× Evolution Data Optimized (EVDO), Code Division Multiple Access-2000 (cdma2000 3×), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, intelligent operations interface may be applied independently of the method of data transport and does not depend on any particular network architecture or underlying protocols.

Figure 6:
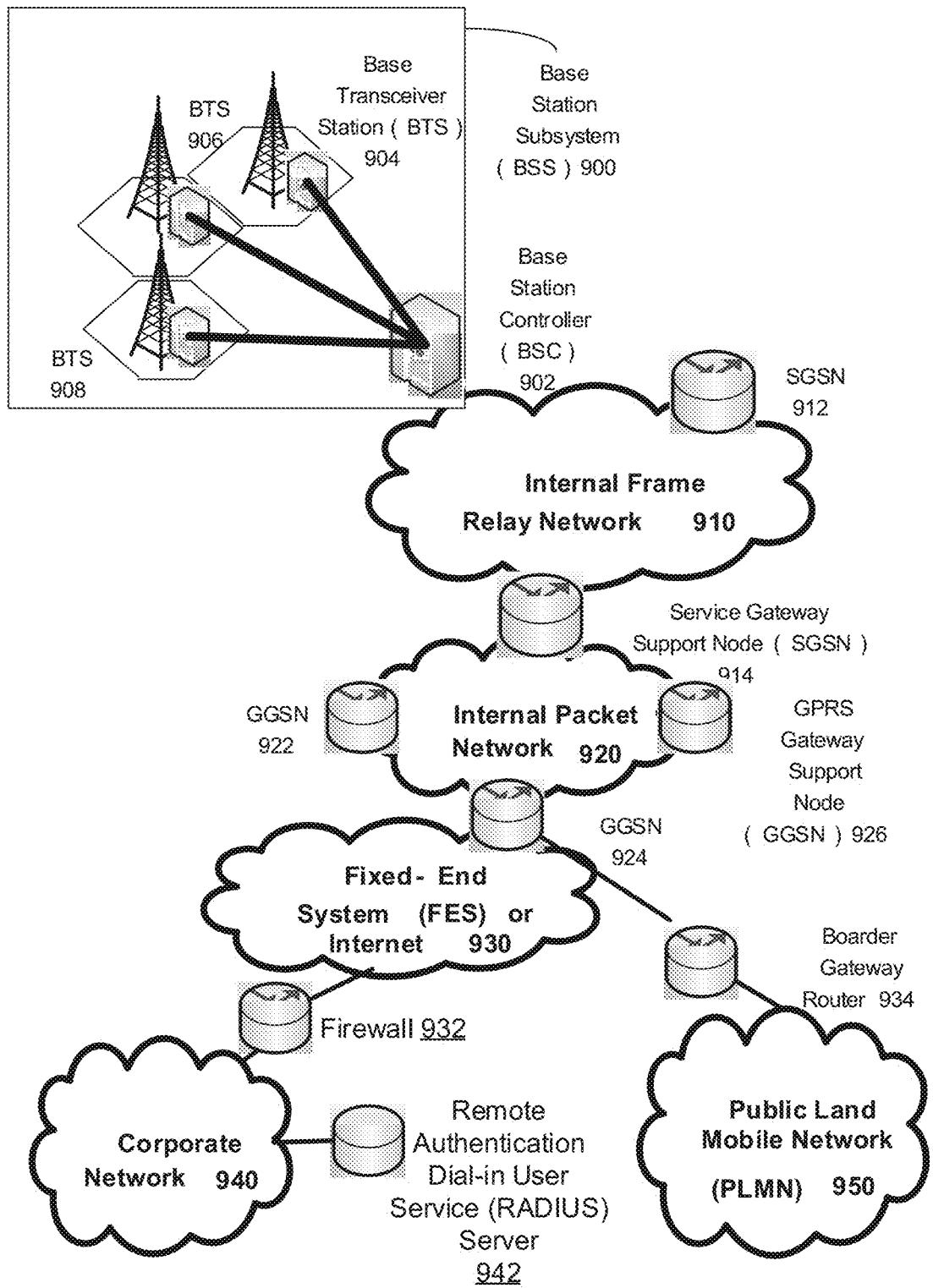
FIG. 6 is a block diagram of a non-limiting exemplary packet-based mobile cellular network environment, such as a GPRS network, in which one or more disclosed embodiments of an intelligent operations interface may be implemented.

FIG. 6 depicts an overall block diagram of an exemplary packet-based mobile cellular network environment, such as a GPRS network, in which intelligent operations interface such as those described herein may be practiced. In an example configuration, any RAN as described herein may be encompassed by or interact with the network environment depicted in FIG. 6. Similarly, mobile devices 110 and 111 may communicate or interact with a network environment such as that depicted in FIG. 6. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., mobile devices 110 and 111) become connected to the wireless network. In exemplary fashion, the packet traffic originating from user devices (e.g., mobile devices 110 and 111) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 7:
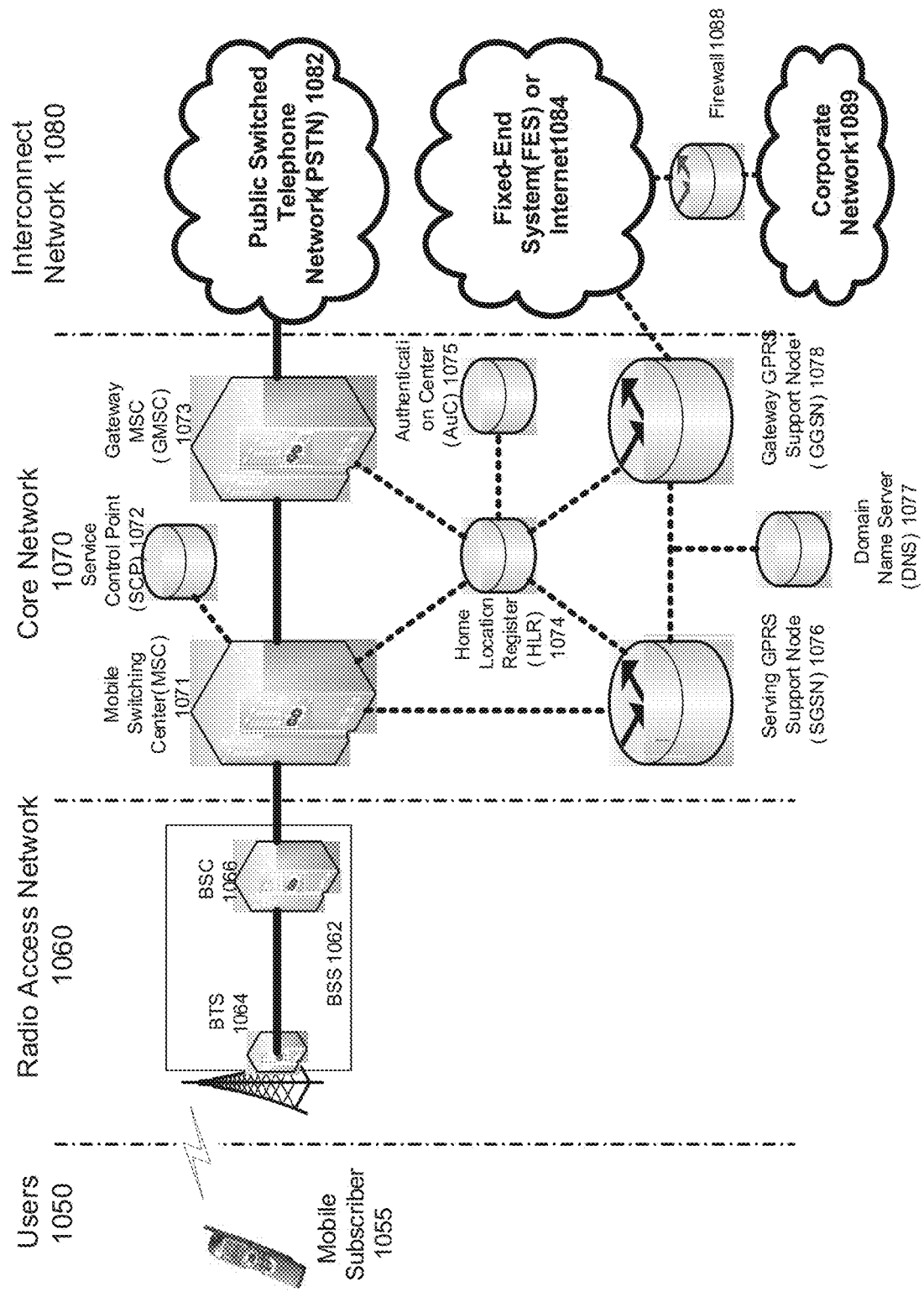
FIG. 7 illustrates a non-limiting exemplary architecture of a typical GPRS network, segmented into four groups, in which one or more disclosed embodiments of an intelligent operations interface may be implemented.

FIG. 7 illustrates an architecture of a typical GPRS network in which one or more disclosed embodiments of intelligent operations interface may be implemented. The architecture if FIG. 7 is segmented into four groups: users 1050, radio access network 1060, core network 1070, and interconnect network 1080. Users 1050 may comprise a plurality of end users (though only mobile subscriber 1055 is shown in FIG. 7). In an example embodiment, the device depicted as mobile subscriber 1055 may comprise any of mobile devices 110 and 111. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 7, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some embodiments, HLR 1074 may be a device such as HSSs. HLR 1074 may store static information about the subscribers such as the International Mobile Subscriber Identity (IMSI), APN profiles as described herein, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as mobile devices 110 and 111, used by an end user of a mobile cellular service or a wireless provider. When a mobile subscriber turns on his or her mobile device, the mobile device may go through an attach process by which the mobile device attaches to an SGSN of the GPRS network. In FIG. 7, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, that may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of intelligent operations interface such as those described herein may include, but are not limited to, Gateway GPRS Support Node tables, Fixed End System router tables, firewall systems, VPN tunnels, and any number of other network elements as required by the particular digital network.

Figure 8:
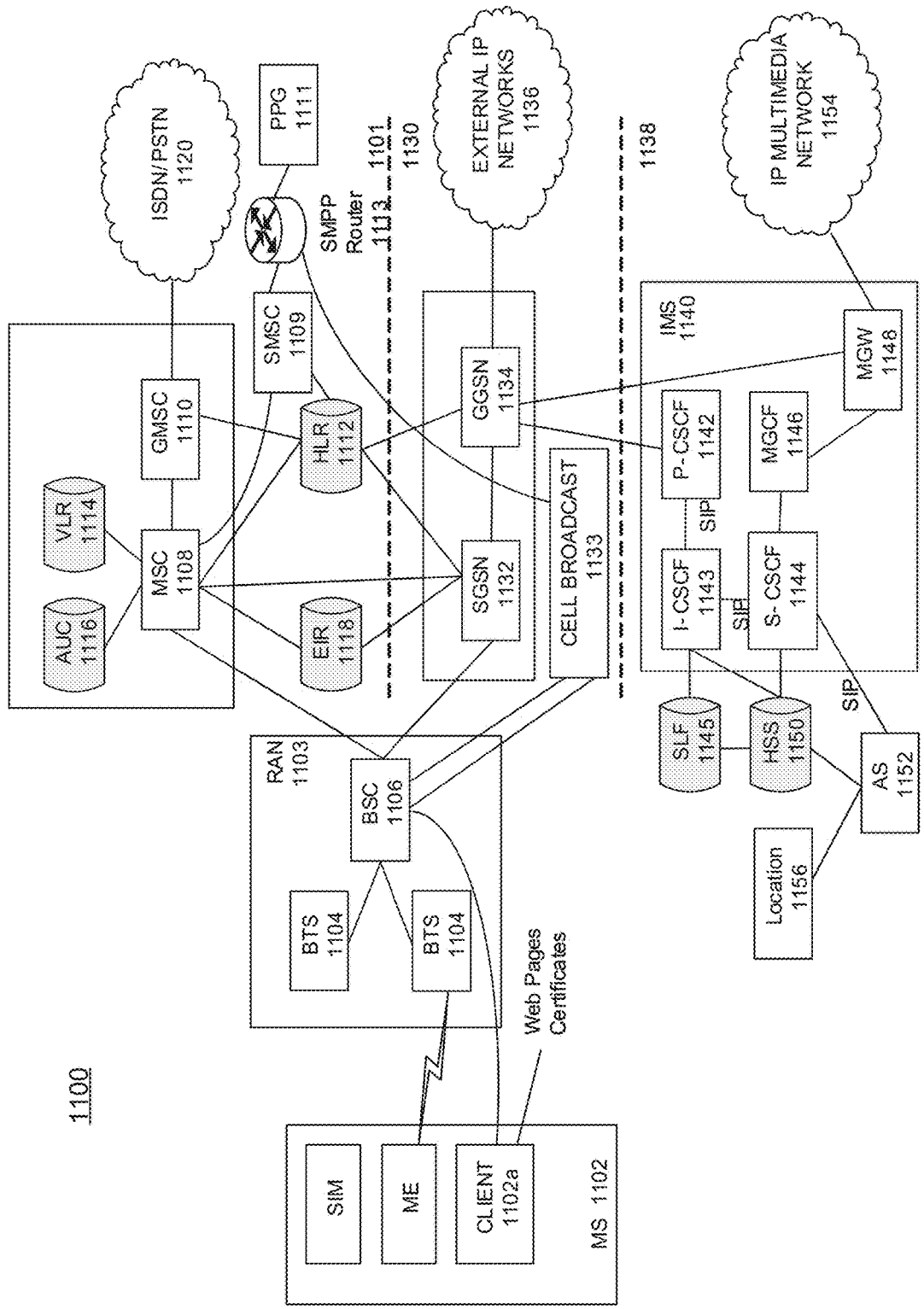
FIG. 8 illustrates a non-limiting alternate block diagram of an exemplary GSM/GPRS/IP multimedia network architecture in which one or more disclosed embodiments of an intelligent operations interface may be implemented.

FIG. 8 illustrates another exemplary block diagram view of a GSM/GPRS/IP multimedia network architecture 1100 in which the systems and methods for intelligent operations interface such as those described herein may be incorporated. As illustrated, architecture 1100 of FIG. 8 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., mobile devices 110 and 111) that is used by mobile subscribers, in one embodiment with a Subscriber identity Module (SIM). The SIM includes an International Mobile Subscriber Identity (IMSI), which is a unique identifier of a subscriber. The SIM may also include APNs. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

Figure 9:
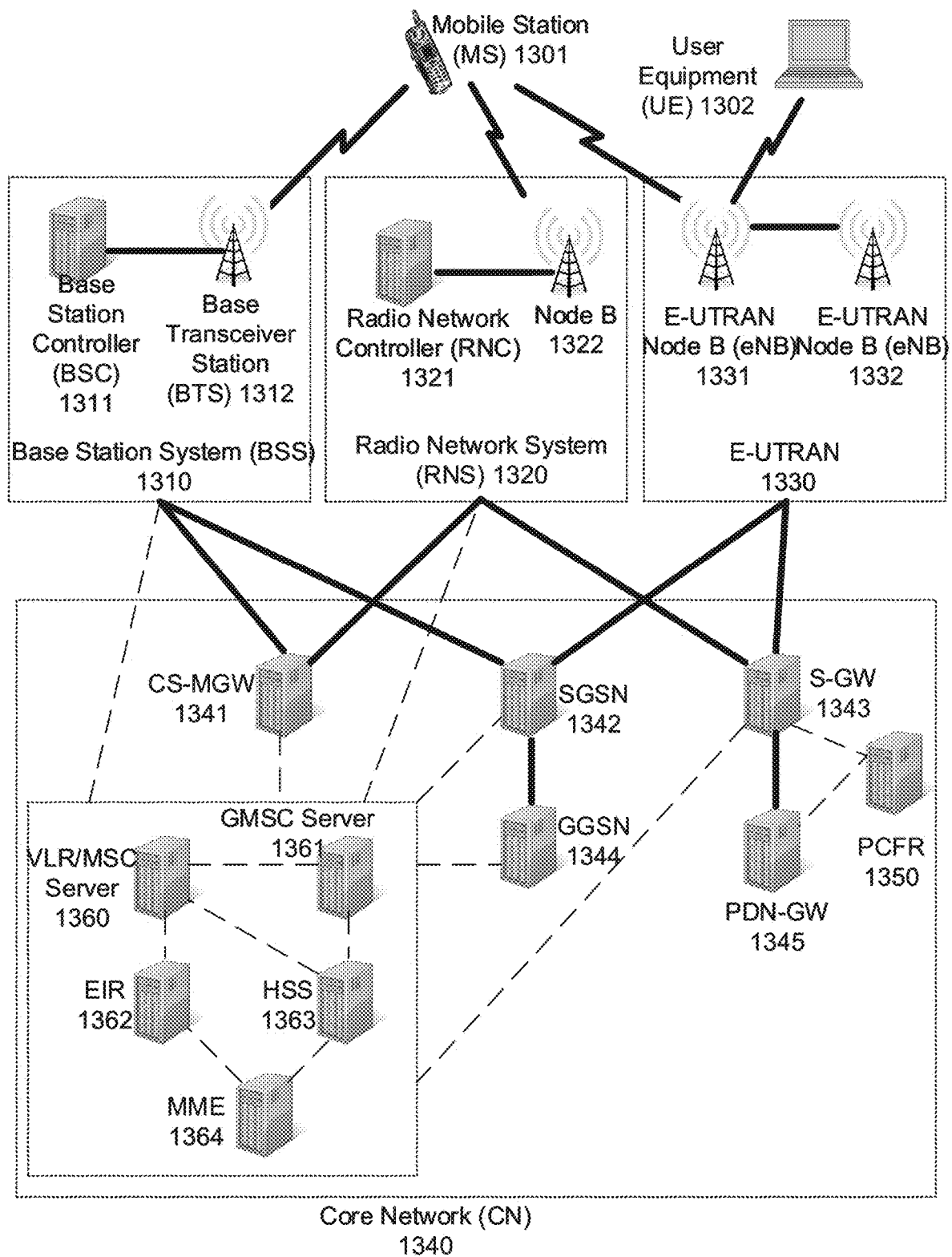
FIG. 9 illustrates a PLMN block diagram view of an exemplary architecture in which one or more disclosed embodiments of an intelligent operations interface may be implemented.

FIG. 9 illustrates a PLMN block diagram view of an exemplary architecture in which one or more disclosed embodiments of intelligent operations interface may be implemented. Mobile Station (MS) 1301 is the physical equipment used by the PLMN subscriber. In one illustrative embodiment, communications device 40 may serve as Mobile Station 1301. Mobile Station 1301 may be one of, but not limited to, a cellular telephone, a cellular telephone in combination with another electronic device or any other wireless mobile communication device.

Mobile Station 1301 may communicate wirelessly with Base Station System (BSS) 1310. BSS 1310 contains a Base Station Controller (BSC) 1311 and a Base Transceiver Station (BTS) 1312. BSS 1310 may include a single BSC 1311/BTS 1312 pair (Base Station) or a system of BSC/BTS pairs which are part of a larger network. BSS 1310 is responsible for communicating with Mobile Station 1301 and may support one or more cells. BSS 1310 is responsible for handling cellular traffic and signaling between Mobile Station 1301 and Core Network 1340. Typically, BSS 1310 performs functions that include, but are not limited to, digital conversion of speech channels, allocation of channels to mobile devices, paging, and transmission/reception of cellular signals.

Additionally, Mobile Station 1301 may communicate wirelessly with Radio Network System (RNS) 1320. RNS 1320 contains a Radio Network Controller (RNC) 1321 and one or more Node(s) B 1322. RNS 1320 may support one or more cells. RNS 1320 may also include one or more RNC 1321/Node B 1322 pairs or alternatively a single RNC 1321 may manage multiple Nodes B 1322. RNS 1320 is responsible for communicating with Mobile Station 1301 in its geographically defined area. RNC 1321 is responsible for controlling the Node(s) B 1322 that are connected to it and is a control element in a UMTS radio access network. RNC 1321 performs functions such as, but not limited to, load control, packet scheduling, handover control, security functions, as well as controlling Mobile Station 1301's access to the Core Network (CN) 1340.

The evolved UMTS Terrestrial Radio Access Network (E-UTRAN) 1330 is a radio access network that provides wireless data communications for Mobile Station 1301 and User Equipment 1302. E-UTRAN 1330 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1330 may include of series of logical network components such as E-UTRAN Node B (eNB) 1331 and E-UTRAN Node B (eNB) 1332. E-UTRAN 1330 may contain one or more eNBs. User Equipment 1302 may be any user device capable of connecting to E-UTRAN 1330 including, but not limited to, a personal computer, laptop, mobile device, wireless router, or other device capable of wireless connectivity to E-UTRAN 1330. The improved performance of the E-UTRAN 1330 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 9 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1301 may communicate with any or all of BSS 1310, RNS 1320, or E-UTRAN 1330. In a illustrative system, each of BSS 1310, RNS 1320, and E-UTRAN 1330 may provide Mobile Station 1301 with access to Core Network 1340. The Core Network 1340 may include of a series of devices that route data and communications between end users. Core Network 1340 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1341 is part of Core Network 1340, and interacts with Visitor Location Register (VLR) and Mobile-Services Switching Center (MSC) Server 1360 and Gateway MSC Server 1361 in order to facilitate Core Network 1340 resource control in the CS domain. Functions of CS-MGW 1341 include, but are not limited to, media conversion, bearer control, payload processing and other mobile network processing such as handover or anchoring. CS-MGW 1340 may receive connections to Mobile Station 1301 through BSS 1310, RNS 1320 or both.

Serving GPRS Support Node (SGSN) 1342 stores subscriber data regarding Mobile Station 1301 in order to facilitate network functionality. SGSN 1342 may store subscription information such as, but not limited to, the International Mobile Subscriber Identity (IMSI), temporary identities, or Packet Data Protocol (PDP) addresses. SGSN 1342 may also store location information such as, but not limited to, the Gateway GPRS Support Node (GGSN) 1344 address for each GGSN where an active PDP exists. GGSN 1344 may implement a location register function to store subscriber data it receives from SGSN 1342 such as subscription or location information.

Serving Gateway (S-GW) 1343 is an interface which provides connectivity between E-UTRAN 1330 and Core Network 1340. Functions of S-GW 1343 include, but are not limited to, packet routing, packet forwarding, transport level packet processing, event reporting to Policy and Charging Rules Function (PCRF) 1350, and mobility anchoring for inter-network mobility. PCRF 1350 uses information gathered from S-GW 1343, as well as other sources, to make applicable policy and charging decisions related to data flows, network resources and other network administration functions. Packet Data Network Gateway (PDN-GW) 1345 may provide user-to-services connectivity functionality including, but not limited to, network-wide mobility anchoring, bearer session anchoring and control, and IP address allocation for PS domain connections.

Home Subscriber Server (HSS) 1363 is a database for user information, and stores subscription data regarding Mobile Station 1301 or User Equipment 1302 for handling calls or data sessions. Networks may contain one HSS 1363 or more if additional resources are required. Exemplary data stored by HSS 1363 include, but is not limited to, user identification, numbering and addressing information, security information, or location information. HSS 1363 may also provide call or session establishment procedures in both the PS and CS domains.

The VLR/MSC Server 1360 provides user location functionality. When Mobile Station 1301 enters a new network location, it begins a registration procedure. A MSC Server for that location transfers the location information to the VLR for the area. A VLR and MSC Server may be located in the same computing environment, as is shown by VLR/MSC Server 1360, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1301 registration or procedures for handover of Mobile Station 1301 to a different section of the Core Network 1340. GMSC Server 1361 may serve as a connection to alternate GMSC Servers for other mobile stations in larger networks.

Equipment Identity Register (EIR) 1362 is a logical element which may store the International Mobile Equipment Identities (IMEI) for Mobile Station 1301. In a typical embodiment, user equipment may be classified as either "white listed" or "black listed" depending on its status in the network. In one embodiment, if Mobile Station 1301 is stolen and put to use by an unauthorized user, it may be registered as "black listed" in EIR 1362, preventing its use on the network. Mobility Management Entity (MME) 1364 is a control node which may track Mobile Station 1301 or User Equipment 1302 if the devices are idle. Additional functionality may include the ability of MME 1364 to contact an idle Mobile Station 1301 or User Equipment 1302 if retransmission of a previous session is required.

While example embodiments of systems and methods for intelligent operations interface have been described in connection with various communications devices and computing devices/processors, the underlying concepts can be applied to any communications or computing device, processor, or system capable of implementing the intelligent operations interface described. The various techniques described herein may be implemented in connection with hardware or a combination of hardware and software. Thus, the methods and apparatuses for intelligent operations interface, or certain aspects or portions thereof, can take the form of program code (i.e., instructions) embodied in tangible and/or a medium that is not a transient signal, such as floppy diskettes, CD-ROMs, hard drives, or any other machine-readable storage medium, wherein, when the program code is loaded into and executed by a machine, such as a computer, the machine becomes an apparatus for intelligent operations interface. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for intelligent operations interface may also be practiced via communications embodied in the form of program code that is transmitted over some transmission medium, such as over electrical wiring or cabling, through fiber optics, or via any other form of transmission, wherein, when the program code is received, loaded into, and executed by a machine, such as an EPROM, a gate array, a programmable logic device (PLD), a client computer, or the like, the machine becomes an apparatus for intelligent operations interface. When implemented on a general-purpose processor, the program code combines with the processor to provide a unique apparatus that operates to invoke the functionality of intelligent operations interface as described herein. Additionally, any storage techniques used in connection with an intelligent operations interface system may invariably be a combination of hardware and software.

While intelligent operations interface have been described in connection with the various embodiments of the various figures, it is to be understood that other similar embodiments may be used or modifications and additions may be made to the described embodiments for performing the same function of intelligent operations interface without deviating therefrom. The intelligent operations interface described herein, although discussed in separate exemplary embodiments, may be modified to combine or delete features of the exemplary embodiments. For example, one skilled in the art will recognize intelligent operations interface as described in the present application may apply to any environment, whether wired or wireless, and may be applied to any number of such devices connected via a communications network and interacting across the network. Therefore, intelligent operations interface should not be limited to any single embodiment, but rather should be construed in breadth and scope in accordance with the appended claims.

What is claimed:

1. A method comprising:

receiving information by a first network device, wherein the information comprises a performance indicator;

detecting, by the first network device, that the performance indicator has crossed a predetermined performance indicator threshold, wherein the performance indicator crossing the predetermined performance indicator threshold is indicative of a performance problem in a network service, wherein the performance problem comprises one or more outages associated with the network service;

determining, by the first network device, the performance problem in the network service based on a first analysis of the information;

subsequent to determining the performance problem in the network service, obtaining a plurality of surveys associated with customer satisfaction with the network service;

determining, by the first network device, a plurality of solution instructions that resolve the determined performance problem in the network service based on a second analysis of the information, wherein the plurality of solution instructions comprise at least an instruction to repair the network service;

determining, by the first network device, a ripple effect for each of the plurality of solution instructions that resolve the determined performance problem in the network service;

determining, by the first network device, a priority for each of the plurality of solution instructions based on the plurality of surveys and ripple effect for each of the plurality of solution instructions that resolve the determined performance problem in the network service; and based on the determined priority, providing, by the first network device, a solution instruction of the plurality of solution instructions in order to restore the network service.

2. The method of claim 1, wherein providing the solution instruction causes a network element to automatically execute the solution instruction.

3. The method of claim 1, further comprising:

assigning a confidence level to the solution instruction; and providing the solution instruction based on the confidence level crossing a threshold confidence level.

4. The method of claim 1, further comprising assigning a confidence level to the solution instruction, wherein the solution instruction is provided to a display when the confidence level crosses a threshold confidence level.

5. The method of claim 1, wherein the information comprises usage level of a service.

6. The method of claim 1, wherein the information comprises data associated with skill level of personnel.

7. The method of claim 1, wherein the information comprises predicted weather conditions.

8. A network device comprising:

a processor; and a memory coupled to the processor, the memory having stored thereon executable instructions that when executed by the processor cause the processor to effectuate operations comprising:

receiving information, wherein the information comprises a performance indicator;

detecting that the performance indicator has crossed a predetermined threshold, wherein the performance indicator crossing the predetermined threshold is indicative of a performance problem in a network service, wherein the performance problem comprises one or more outages associated with the network service;

determining the performance problem in the network service based on a first analysis of the information;

subsequent to determining the performance problem in the network service, obtaining a plurality of surveys associated with customer satisfaction with the network service;

determining a plurality of solution instructions that resolve the determined performance problem in the network service based on a second analysis of the information, and wherein the plurality of solution instructions comprise at least an instruction to repair the network service;

determining a ripple effect for each of the plurality of solution instructions that resolve the determined performance problem in the network service;

determining a priority for each of the plurality of solution instructions based on the plurality of surveys and ripple effect for each of the plurality of solution instructions that resolve the determined performance problem in the network service; and based on the determined priority, providing a solution instruction of the plurality of solution instructions in order to restore the network service.

9. The network device of claim 8, wherein providing the solution instruction causes a network element to automatically execute the solution instruction.

10. The network device of claim 8, further comprising executable instructions that when executed by the processor cause the processor to effectuate operations comprising assigning a confidence level to the solution instruction, wherein the solution instruction is automatically executed by a second network device when the confidence level is above a threshold confidence level.

11. The network device of claim 8, further comprising executable instructions that when executed by the processor cause the processor to effectuate operations comprising assigning a confidence level to the solution instruction, wherein the solution instruction is provided to a display when the confidence level crosses a threshold confidence level.

12. The network device of claim 8, wherein the information comprises usage level of a service.

13. The network device of claim 8, wherein the information comprises trending social media information.

14. The network device of claim 8, wherein the information comprises predicted weather conditions.

15. A non-transitory computer readable storage medium comprising computer executable instructions that when executed by a processor cause said processor to effectuate operations comprising:

receiving information by a first network device, wherein the information comprises a performance indicator;

detecting that the performance indicator has crossed a predetermined performance indicator threshold, wherein the performance indicator crossing the predetermined performance indicator threshold is indicative of a performance problem in a network service, wherein the performance problem comprises one or more outages associated with the network service;

determining the performance problem in the network service based on a first analysis of the information;

subsequent to determining the performance problem in the network service, obtaining a plurality of surveys associated with customer satisfaction with the network service;

determining a plurality of solution instruction that resolve the determined performance problem in the network service based on a second analysis of the information, and wherein the plurality of solution instructions comprise at least an instruction to repair the network service;

determining, by the first network device, a ripple effect for each of the plurality of solution instructions that resolve the determined performance problem in the network service;

determining a priority for each of the plurality of solution instructions based on the plurality of surveys or ripple effect for each of the plurality of solution instructions that resolve the determined performance problem in the network service; and based on the determined priority, providing a solution instruction of the plurality of solution instructions in order to restore the network service.

16. The non-transitory computer readable storage medium of claim 15, wherein providing the solution instruction causes a network element to automatically execute the solution instruction.

17. The non-transitory computer readable storage medium of claim 15, further comprising executable instructions that when executed by the processor cause the processor to effectuate operations comprising assigning a confidence level to the first solution instruction, wherein the solution instruction is provided to a display when the confidence level is above a threshold confidence level.

18. The non-transitory computer readable storage medium of claim 15, further comprising executable instructions that when executed by the processor cause the processor to effectuate operations comprising assigning a confidence level to the first solution instruction, wherein the solution instruction is automatically executed by a network element when the confidence level crosses a threshold confidence level.

19. The non-transitory computer readable storage medium of claim 15, wherein the information comprises predicted weather conditions.

20. The non-transitory computer readable storage medium of claim 15, wherein the information comprises trending social media information or survey information.

* * * * *